(12) United States Patent
Guo et al.

(10) Patent No.: US 9,479,652 B2
(45) Date of Patent: Oct. 25, 2016

(54) METHOD, SYSTEM, GATEWAY, AND SERVER FOR CANCELING REDIRECTION

(71) Applicant: Huawei Technologies Co., Ltd., Shenzhen, Guangdong (CN)

(72) Inventors: Jiancheng Guo, Beijing (CN); Xiao Chen, Beijing (CN); Qingchun Lin, Beijing (CN); Ying Zhu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/737,227

(22) Filed: Jun. 11, 2015

(65) Prior Publication Data

US 2015/0281466 A1 Oct. 1, 2015

Related U.S. Application Data

(63) Continuation of application No. PCT/CN2012/086641, filed on Dec. 14, 2012.

(51) Int. Cl.
| | |
|---|---|
| *H04M 11/00* | (2006.01) |
| *H04M 15/00* | (2006.01) |
| *H04L 12/14* | (2006.01) |
| *H04L 12/24* | (2006.01) |
| *H04M 17/00* | (2006.01) |

(52) U.S. Cl.
CPC .............. *H04M 15/66* (2013.01); *H04L 12/14* (2013.01); *H04L 12/1407* (2013.01); *H04L 41/0893* (2013.01); *H04M 15/71* (2013.01); *H04M 15/88* (2013.01); *H04M 17/204* (2013.01); *H04M 2215/82* (2013.01)

(58) Field of Classification Search
USPC ........................................................ 455/406
See application file for complete search history.

(56) References Cited

U.S. PATENT DOCUMENTS

| | | | |
|---|---|---|---|
| 2008/0010379 A1 | 1/2008 | Zhao | |
| 2010/0229232 A1 | 9/2010 | Hellgren et al. | |

FOREIGN PATENT DOCUMENTS

| | | |
|---|---|---|
| CN | 101442732 A | 5/2009 |
| CN | 101803276 A | 8/2010 |
| EP | 2 040 413 A1 | 3/2009 |
| EP | 2 415 204 B1 | 8/2015 |
| WO | WO 2012/065626 A1 | 5/2012 |

OTHER PUBLICATIONS

"3rd Generation Partnership Project: Technical Specification Group Services and System Aspects; Policy and charging control architecture (Release 7)", 3GPP TS 23.203 V7.5.0, Dec. 2007, 72 pages.

*Primary Examiner* — Joel Ajayi (57) ABSTRACT

The present invention relates to a method, a system, a gateway, and a server for canceling redirection. When balances of a user are insufficient, a gateway (GW) receives a redirection policy delivered by a policy and charging rules function (PCRF) and redirects the user to a recharging page of a server; after recharging is finished, the server sends a recharging success packet to the GW, and the GW instructs the PCRF to cancel the redirection policy. In this way, after the recharging succeeds, the server directly sends the recharging success packet to the GW, and the GW can immediately instruct the PCRF to cancel the redirection policy after receiving the packet. Therefore, no delay problem of a billing system exists, thereby avoiding that the user is repeatedly redirected to the recharging page of the server during a delay time and enhancing user experience.

20 Claims, 4 Drawing Sheets

FIG. 7

METHOD, SYSTEM, GATEWAY, AND SERVER FOR CANCELING REDIRECTION

CROSS-REFERENCE TO RELATED APPLICATIONS

This application is a continuation of International Application No. PCT/CN2012/086641, filed on Dec. 14, 2012, which is hereby incorporated by reference in its entirety.

TECHNICAL FIELD

The present invention relates to the communications field, and in particular, to a method, a system, a gateway, and a server for canceling redirection.

BACKGROUND

In a communications system, if balances for a service subscribed to by a user are insufficient, a customary processing method in the industry is as follows: An operator delivers a redirection policy by using a policy and charging rules function (Policy and Charging Rules Function, PCRF) and instructs a gateway (Gateway, GW) to redirect the user to a recharging page for recharging. After the user finishes the recharging, the recharging page notifies a billing system that the recharging is finished, a recharging system notifies the PCRF that the recharging is finished, and the PCRF redelivers a normal service policy to the GW.

A problem of the foregoing method is as follows: After the user finishes the recharging, the billing system often can instruct the PCRF to cancel redirection and deliver the normal policy only after a delay time. The user is repeatedly redirected to the recharging page during the delay time, which affects user experience.

SUMMARY

Embodiments of the present invention provide a method, a system, a gateway, and a server for canceling redirection. In this way, a PCRF is capable of quickly canceling a redirection policy after recharging succeeds, thereby avoiding that a user is repeatedly redirected to a recharging page and enhancing user experience.

In a first aspect, an embodiment of the present invention provides a method for canceling redirection, where the method includes:
redirecting, by a gateway GW, a user equipment UE to a recharging page of a server according to a redirection policy;
receiving a recharging success packet sent by the server; and
instructing, according to the recharging success packet, a policy and charging rules function PCRF to cancel the redirection policy.

In a second aspect, an embodiment of the present invention provides a method for canceling redirection, where the method includes:
receiving, by a server, a recharging request of a UE; and
if recharging for the UE succeeds, sending a recharging success packet to a GW for the GW to instruct a PCRF to cancel a redirection policy.

In a third aspect, an embodiment of the present invention provides a gateway, where the gateway includes:
a redirecting unit, configured to redirect a UE to a recharging page of a server according to a redirection policy;
a receiving unit, configured to receive a recharging success packet sent by the server; and
a canceling unit, configured to instruct, according to the recharging success packet, a PCRF to cancel the redirection policy.

In a fourth aspect, an embodiment of the present invention provides a server, where the server includes:
a receiving unit, configured to receive a recharging request of a UE sent by a GW; and
a canceling unit, configured to, if recharging for the UE succeeds, send a recharging success packet to the GW for the GW to instruct a PCRF to cancel a redirection policy.

In a fifth aspect, an embodiment of the present invention provides a gateway, where the gateway includes:
a network interface;
a processor;
a memory; and
an application program physically stored in the memory, where the application program includes an instruction that may be used to instruct the processor to execute the following process:
redirecting a UE to a recharging page of a server according to a redirection policy;
receiving a recharging success packet sent by the server; and
instructing, according to the recharging success packet, a PCRF to cancel the redirection policy.

In a sixth aspect, an embodiment of the present invention provides a server, where the server includes:
a network interface;
a processor;
a memory; and
an application program physically stored in the memory, where the application program includes an instruction that may be used to instruct the processor to execute the following process:
receiving a recharging request of a UE; and
if recharging for the UE succeeds, sending a recharging success packet to a GW for the GW to instruct a PCRF to cancel a redirection policy.

In a seventh aspect, an embodiment of the present invention provides a system for canceling redirection, where the system includes: the GW and the server that are described previously.

In the embodiments of the present invention, when balances of a user are insufficient, a GW receives a redirection policy delivered by a PCRF and redirects the user to a recharging page of a server; after recharging is finished, the server sends a recharging success packet to the GW, and the GW instructs the PCRF to cancel the redirection policy. In this way, after the recharging succeeds, the server directly sends the recharging success packet to the GW, and the GW can immediately instruct the PCRF to cancel the redirection policy after receiving the packet. Therefore, no delay problem of a billing system exists, thereby avoiding that the user is repeatedly redirected to the recharging page of the server during a delay time and enhancing user experience.

DETAILED DESCRIPTION

The following further describes the technical solutions of the present invention in detail with reference to the accompanying drawings and embodiments.

In embodiments of the present invention, when balances of a user are insufficient, a GW receives a redirection policy delivered by a PCRF and redirects the user to a recharging page of a server; after recharging is finished, the server sends a recharging success packet to the GW, and the GW instructs the PCRF to cancel the redirection policy. In this way, after the recharging succeeds, the server directly sends the recharging success packet to the GW, and the GW can immediately instruct the PCRF to cancel the redirection policy after receiving the packet. Therefore, no delay problem of a billing system exists, thereby avoiding that the user is repeatedly redirected to the recharging page of the server during a delay time and enhancing user experience.

Figure 1:
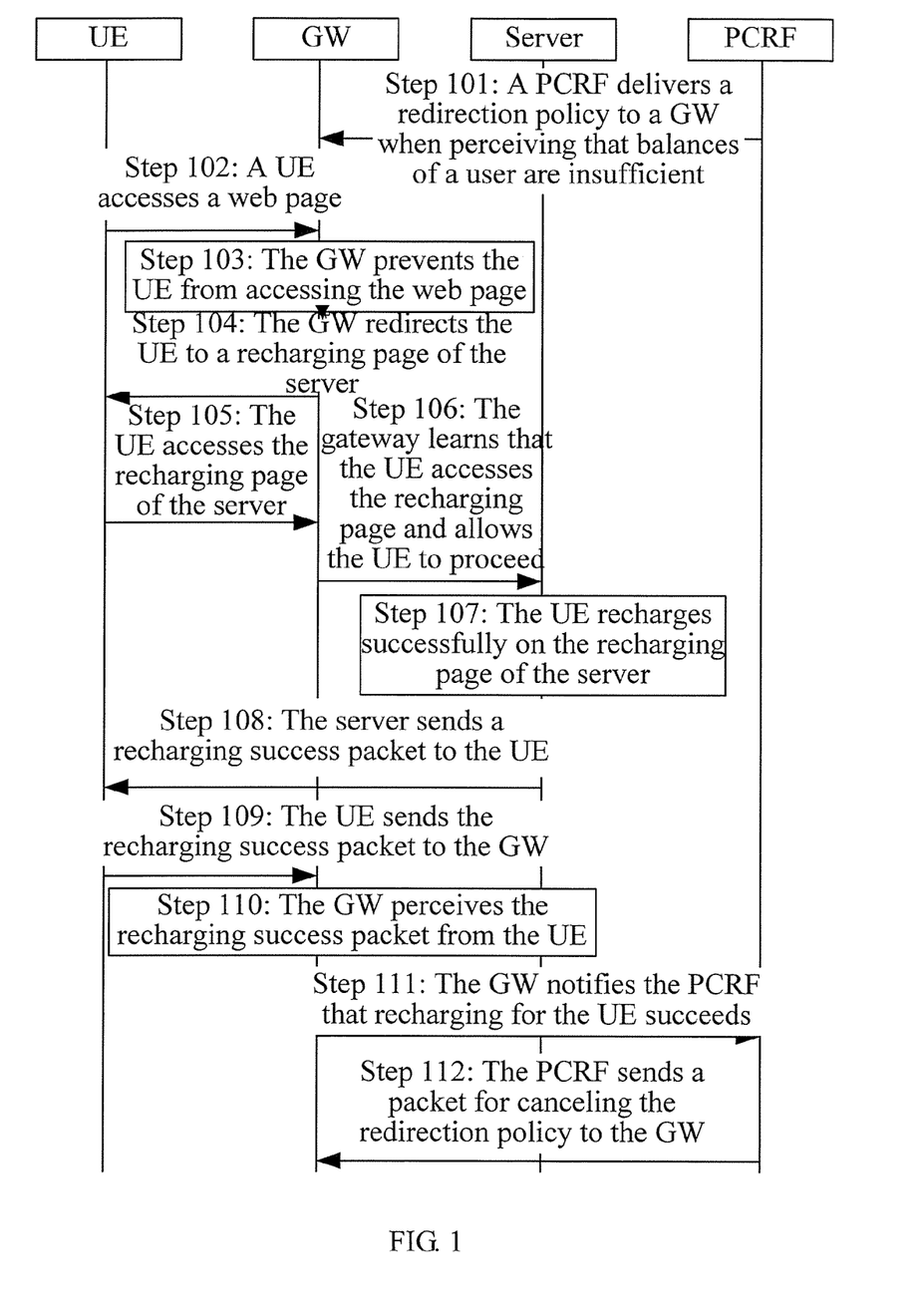
FIG. 1 is a signaling flowchart of a method for canceling redirection according to a first embodiment of the present invention.

The following embodiment describes a process in which a GW and a server cooperate with each other to finish canceling redirection to avoid a process in which a user is repeatedly redirected to a recharging page for processing. FIG. 1 is a flowchart of a method for canceling redirection according to a first embodiment of the present invention. As shown in FIG. 1, the method provided in the embodiment of the present invention includes:

Step 101: A PCRF delivers a redirection policy to a GW when perceiving that balances of a user are insufficient.

Specifically, when perceiving that the balances of the user are insufficient, the PCRF delivers the redirection policy to the GW for the GW to redirect the user to a recharging page of a server for recharging.

Step 102: A UE accesses a web page.

Specifically, the GW may monitor a packet between the UE and the web page accessed by the UE; therefore, when the UE accesses the web page normally, the GW learns, through monitoring, the web page to be accessed by the UE.

Step 103: The GW prevents the UE from accessing the web page.

Specifically, because the balances of the user are insufficient, when learning that the web page to be accessed by the UE is not the recharging page, the GW prevents the UE from accessing the web page.

Step 104: The GW redirects the UE to the recharging page of the server.

After preventing the UE from accessing the web page, the GW may redirect the UE to the recharging page of the server for the UE to recharge.

Step 105: The UE accesses the recharging page of the server.

Step 106: The gateway learns that the UE accesses the recharging page and allows the UE to proceed.

When the UE accesses the recharging page of the server, the GW also learns access of the UE to the web page. When determining that the access is to the recharging page of the server, the GW allows the access of the UE.

Step 107: The UE successfully recharges on the recharging page of the server.

After the UE accesses the recharging page of the server, the UE can finish a recharging process according to a recharging prompt on the recharging page.

Step 108: The server sends a recharging success packet to the UE.

After the recharging is finished, the server sends the recharging success packet to the UE for notifying the UE that the recharging is finished.

Step 109: The UE sends the recharging success packet to the GW.

The UE automatically sends the packet to the GW after receiving the recharging success packet.

Step 110: The GW receives the recharging success packet from the UE.

Step 111: The GW notifies the PCRF that the recharging for the UE succeeds.

After learning that the recharging for the UE succeeds, the GW notifies the PCRF that the recharging for the UE succeeds.

Step 112: The PCRF sends a packet for canceling the redirection policy to the GW.

Specifically, after learning that the recharging for the UE succeeds, the PCRF sends the packet for canceling the redirection policy to the GW. Because the redirection policy is canceled, when the UE accesses the web page again, the GW does not prevent the UE from accessing the web page or redirect the UE to the recharging page of the server.

It should be noted that a method for the GW to learn the recharging success packet of the UE in the foregoing process is as follows: The GW learns, by receiving the recharging success packet sent by the UE, that recharging for the UE succeeds. Another method is as follows: Because the GW can monitor a communication packet between the server and a mobile phone, the GW can obtain, through monitoring, the recharging success packet sent from the server to the UE. Certainly, the GW may also adopt another method to acquire the recharging success packet of the UE, and no further details are provided herein.

In the embodiment of the present invention, when balances of a user are insufficient, a GW receives a redirection policy delivered by a PCRF and redirects the user to a recharging page of a server; after recharging is finished, the server sends a recharging success packet to the GW, and the GW instructs the PCRF to cancel the redirection policy. In this way, after the recharging succeeds, the server directly sends the recharging success packet to the GW, and the GW can immediately instruct the PCRF to cancel the redirection policy after receiving the packet. Therefore, no delay problem of a billing system exists, thereby avoiding that the user is repeatedly redirected to the recharging page of the server during a delay time and enhancing user experience.

Figure 2:
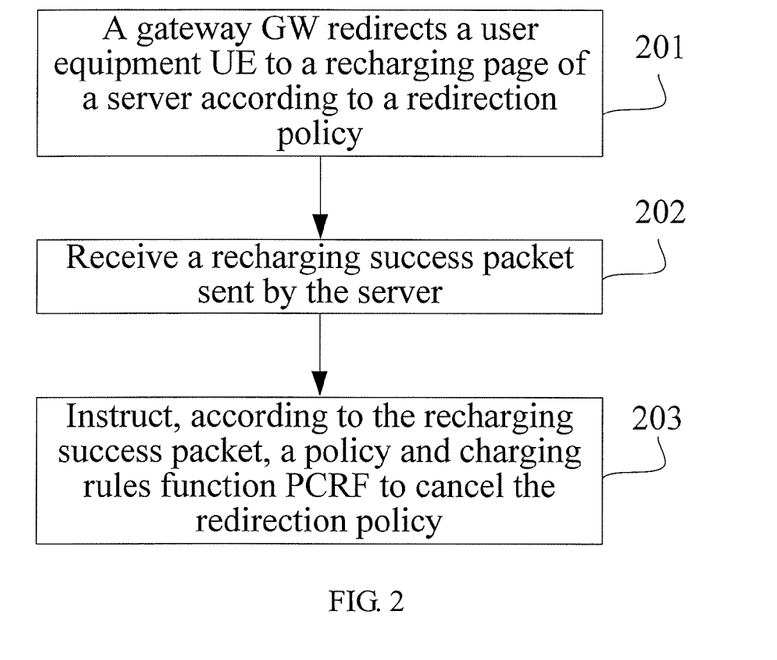
FIG. 2 is a flowchart of a method for canceling redirection according to a second embodiment of the present invention.

The following embodiment describes a method for canceling redirection, where a GW is used as a main entity. FIG. 2 is a flowchart of a method for canceling redirection according to a second embodiment of the present invention. As shown in FIG. 2, the method provided in the embodiment of the present invention includes:

Step 201: A GW redirects a UE to a recharging page of a server according to a redirection policy.

Specifically, a PCRF sends the redirection policy to the GW when perceiving that balances of a user are insufficient, and therefore, the GW redirects the UE to the recharging page of the server for the UE to recharge. After the recharging succeeds, the server sends a recharging success packet to the UE. A button may be set on the recharging page of the server. The button is bound to a uniform resource locator (Uniform Resource Locator, URL) that indicates recharging success, where it is assumed that the URL is www.chargesuccess.com. After the recharging succeeds, the user may click the button. After the button is clicked, a packet including the URL www.chargesuccess.com is sent to the UE. Because the GW can monitor a packet between the UE and a web page accessed by the UE, the GW can acquire the packet, thereby learning that the recharging for the UE succeeds.

It should be noted that the server may also send the recharging success packet to the UE by using another method, and it is not limited to the foregoing method.

Step 202: The GW receives the recharging success packet sent by the server.

Specifically, a browser sends the recharging success packet to the UE, and the GW acquires the recharging success packet at the same time. Because the GW can monitor a packet between the UE and the web page accessed by the UE, when the server sends the recharging success packet to the UE, the GW can obtain the packet through monitoring. In addition, when receiving the recharging success packet sent by the server, the UE may automatically send the packet to the GW, and therefore the GW learns, by accepting the packet sent by the UE rather than performing the monitoring action, that the recharging for the UE succeeds.

Step 203: The GW instructs, according to the recharging success packet, the PCRF to cancel the redirection policy.

After learning that the recharging for the UE succeeds, the GW may instruct the PCRF to cancel the redirection policy. After the redirection policy is canceled, when the UE accesses the web page again, the GW does not prevent the UE from accessing the web page or redirect the UE to the recharging page of the server.

In the embodiment of the present invention, a GW redirects a user equipment UE to a recharging page of a server according to a redirection policy, receives a recharging success packet sent by the server, and instructs, according to the recharging success packet, a PCRF to cancel the redirection policy. After the recharging succeeds, the server directly sends the recharging success packet to the GW, and the GW can immediately instruct the PCRF to cancel the redirection policy after receiving the packet. Therefore, no delay problem of a billing system exists, thereby avoiding that a user is repeatedly redirected to the recharging page of the server during a delay time and enhancing user experience.

Figure 3:
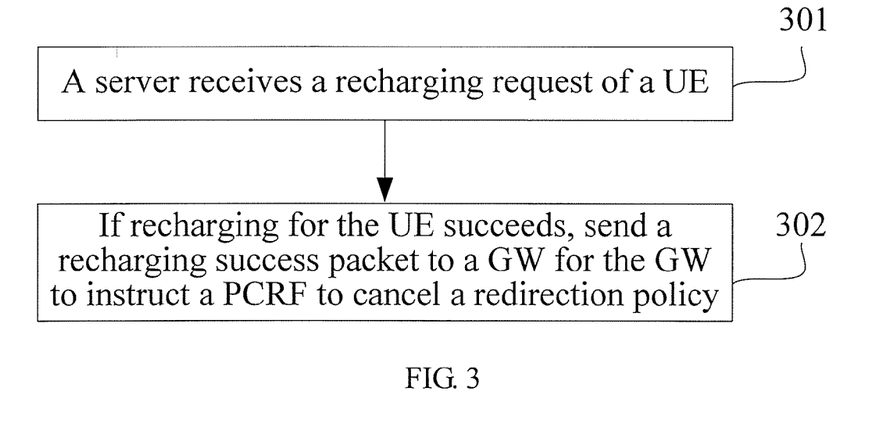
FIG. 3 is a flowchart of a method for canceling redirection according to a third embodiment of the present invention.

The following embodiment describes a method for canceling redirection, where a server is used as a main entity. FIG. 3 is a flowchart of a method for canceling redirection according to a third embodiment of the present invention. As shown in FIG. 3, the method provided in the embodiment of the present invention includes:

Step 301: A server receives a recharging request of a UE.

Specifically, a PCRF sends a redirection policy to a GW when perceiving that balances of a user are insufficient, and the GW redirects the UE to a recharging page of the server, that is, the UE may access the recharging page of the server and request recharging.

Step 302: If recharging for the UE succeeds, send a recharging success packet to the GW for the GW to instruct the PCRF to cancel the redirection policy.

Specifically, the server sends the recharging success packet to the UE, and the GW acquires the recharging success packet at the same time. Because the GW can monitor a packet between the UE and the web page accessed by the UE, when the server sends the recharging success packet to the UE, the GW can obtain the packet through monitoring. In addition, when receiving the recharging success packet sent by the server, the UE may automatically send the packet to the GW. Therefore, the GW can also learn, by accepting the packet sent by the UE rather than performing the monitoring action, that the recharging for the UE succeeds.

After learning that the recharging for the UE succeeds, the GW may instruct the PCRF to cancel the redirection policy. After the redirection policy is canceled, when the UE accesses the web page again, the GW does not prevent the UE from accessing the web page or redirect the UE to the recharging page of the server.

In the embodiment of the present invention, a server receives a recharging request of a UE, and if recharging for the UE succeeds, sends a recharging success packet to a GW for the GW to instruct a PCRF to cancel a redirection policy. Because after the recharging succeeds, the server directly sends the recharging success packet to the GW, and the GW can immediately instruct the PCRF to cancel the redirection policy after receiving the packet, no delay problem of a billing system exists, thereby avoiding that the user is repeatedly redirected to the recharging page of the server during a delay time and enhancing user experience.

Accordingly, embodiments of the present invention provide a GW and a server that correspond to the methods for canceling redirection.

Figure 4:
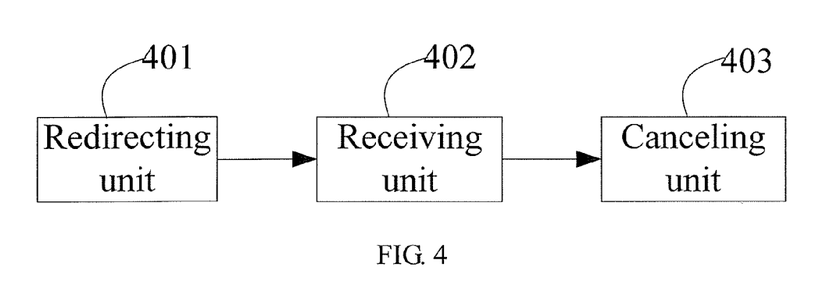
FIG. 4 is a schematic diagram of a gateway according to a fourth embodiment of the present invention.

The following embodiment describes a gateway. FIG. 4 is a schematic diagram of a gateway according to a fourth embodiment of the present invention. As shown in FIG. 4, the gateway provided in the embodiment of the present invention includes a redirecting unit 401, a receiving unit 402, and a canceling unit 403.

The redirecting unit 401 is configured to redirect a UE to a recharging page of a server according to a redirection policy.

The receiving unit 402 is configured to receive a recharging success packet sent by the server.

The canceling unit 403 is configured to instruct, according to the recharging success packet, a PCRF to cancel the redirection policy.

The receiving unit 402 is further configured to receive the redirection policy from the PCRF.

The receiving unit 402 is specifically configured to, the server sends the recharging success packet to the UE, and the GW acquires the recharging success packet at the same time.

The receiving unit 402 is specifically configured to, the server sends the recharging success packet to the UE, and then the UE sends the recharging success packet to the GW.

Because the method in the second embodiment is applied in each unit in the embodiment of the present invention, no further details about a specific work process of each unit are provided herein.

In the embodiment of the present invention, a redirecting unit redirects a user equipment UE to a recharging page of a server according to a redirection policy; a receiving unit receives a recharging success packet sent by the server; and a canceling unit instructs, according to the recharging success packet, a policy and charging rules function PCRF to cancel the redirection policy. Because after the recharging succeeds, the server directly sends the recharging success packet to the GW, and the GW can immediately instruct the PCRF to cancel the redirection policy after receiving the packet, no delay problem of a billing system exists, thereby avoiding that the user is repeatedly redirected to the recharging page of the server during a delay time and enhancing user experience.

Figure 5:
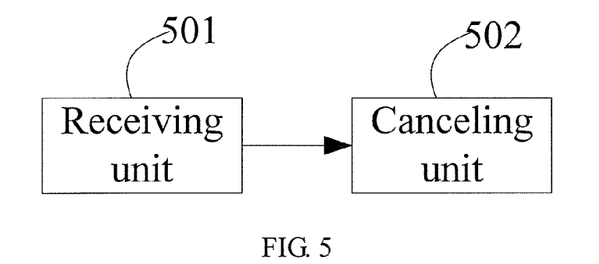
FIG. 5 is a schematic diagram of a server according to a fifth embodiment of the present invention.

The following embodiment describes a server. FIG. 5 is a schematic diagram of a server according to a fifth embodiment of the present invention. As shown in FIG. 5, the server provided in the embodiment of the present invention includes a receiving unit 501 and a canceling unit 502.

The receiving unit 501 is configured to receive a recharging request of a UE sent by a GW.

The canceling unit 502 is configured to, if recharging for the UE succeeds, send a recharging success packet to the GW for the GW to instruct a PCRF to cancel a redirection policy.

That the canceling unit is specifically configured to send the recharging success packet to the GW is specifically as follows: the GW acquires the recharging success packet at the same time.

That the canceling unit is specifically configured to send the recharging success packet to the GW is specifically as follows: the recharging success packet is sent to the UE, and the UE sends the recharging success packet to the GW.

Because the method in the third embodiment is applied in each unit in the embodiment of the present invention, no further details about a specific work process of each unit are provided herein.

In the embodiment of the present invention, a receiving unit receives a recharging request of a UE, and, if recharging for the UE succeeds, a canceling unit sends a recharging success packet to a GW for the GW to instruct a PCRF to cancel a redirection policy. Because the redirection policy can be canceled in time. Because after the recharging succeeds, the server directly sends the recharging success packet to the GW, and the GW can immediately instruct the PCRF to cancel the redirection policy after receiving the packet, no delay problem of a billing system exists, thereby avoiding that a user is repeatedly redirected to a recharging page of the server during a delay time and enhancing user experience.

Figure 6:
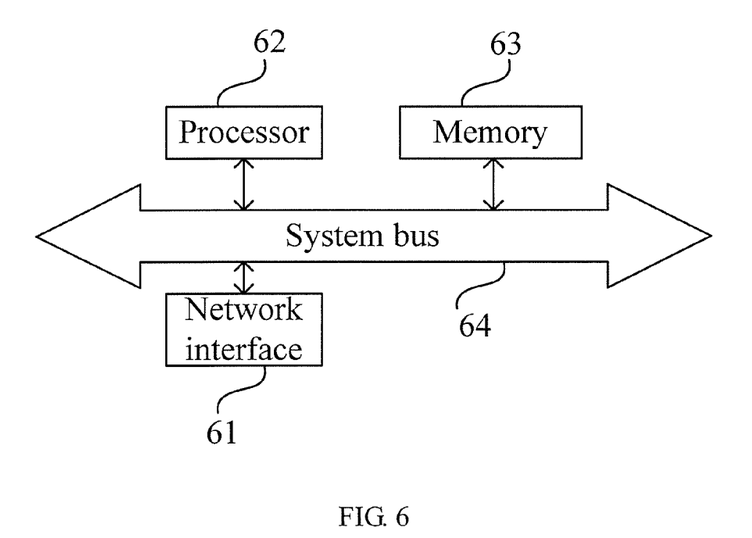
FIG. 6 is a schematic diagram of a gateway according to a sixth embodiment of the present invention.

The following embodiment describes a gateway. FIG. 6 is a schematic diagram of a gateway according to a sixth embodiment of the present invention. As shown in FIG. 6, the gateway provided in the embodiment of the present invention includes a network interface 61, a processor 62, and a memory 63.

A system bus 64 is configured to connect the network interface 61, the processor 62, and the memory 63.

The network interface 61 is configured to communicate with another device.

The memory 63 may be a permanent memory, for example, a hard disk drive and a flash memory. The memory 63 has a software module and a device driver. The software module may be various functional modules that are capable of executing the foregoing method in the present invention, and the device driver may be a network driver and an interface driver.

During startup, these software module are loaded into the memory 63, are then accessed by the processor 62, and execute the following instructions:

redirecting a UE to a recharging page of a server according to a redirection policy;

receiving a recharging success packet sent by the server; and instructing, according to the recharging success packet, a PCRF to cancel the redirection policy.

Specifically, the instruction that are included in an application program and may be used for the process of receiving the recharging success packet sent by the server is as follows:

the server sends the recharging success packet to the UE, and the GW acquires the recharging success packet at the same time; alternatively, the server sends the recharging success packet to the UE, and then the UE sends the recharging success packet to the GW. The application program further includes an instruction that may be used to instruct the processor to execute the following process:

receiving the redirection policy from the PCRF.

In the embodiment of the present invention, a gateway redirects a user equipment UE to a recharging page of a server according to a redirection policy, receives a recharging success packet sent by the server, and instructs, according to the recharging success packet, a PCRF to cancel the redirection policy. Because after the recharging succeeds, the server directly sends the recharging success packet to the GW, and the GW can immediately instruct the PCRF to cancel the redirection policy after receiving the packet, no delay problem of a charging system exists, thereby avoiding that a user is repeatedly redirected to the recharging page of the server during a delay time and enhancing user experience.

Figure 7:
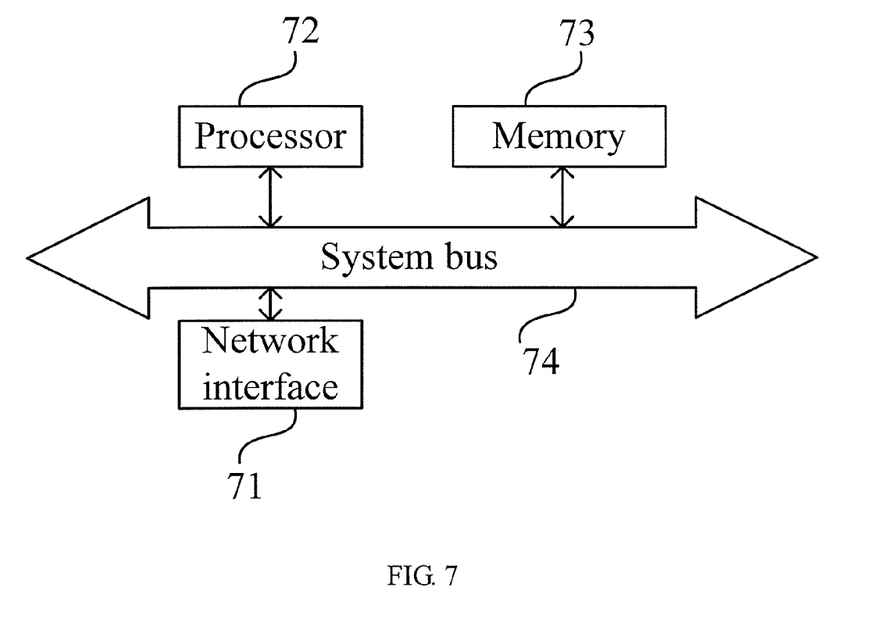
FIG. 7 is a schematic diagram of a server according to a seventh embodiment of the present invention.

The following embodiment describes a server. FIG. 7 is a schematic diagram of a server according to a seventh embodiment of the present invention. As shown in FIG. 7, the server provided in the embodiment of the present invention includes a network interface 71, a processor 72, and a memory 73.

A system bus 74 is configured to connect the network interface 71, the processor 72, and the memory 73.

The network interface 71 is configured to communicate with another device.

The memory 73 may be a permanent memory, for example, a hard disk drive and a flash memory. The memory 73 has a software module and a device driver. The software module may be various functional modules that are capable of executing the foregoing method in the present invention, and the device driver may be a network driver and an interface driver.

During startup, these software module are loaded into the memory 73, are then accessed by the processor 72, and execute the following instructions:

receiving a recharging request of a UE; and if recharging for the UE succeeds, sending a recharging success packet to a GW for the GW to instruct a PCRF to cancel a redirection policy.

Specifically, after the processor 72 accesses the software module of the memory 73, an instruction is executed to implement the following process:

send the recharging success packet to the UE, and the GW acquires the recharging success packet at the same time; alternatively, send the recharging success packet to the UE, and then the UE sends the recharging success packet to the GW.

In the embodiment of the present invention, a server receives a recharging request of a UE, and if recharging for the UE succeeds, sends a recharging success packet to a GW for the GW to instruct a PCRF to cancel a redirection policy. Because the redirection policy can be canceled in time. Because after the recharging succeeds, the server directly sends the recharging success packet to the GW, and the GW can immediately instruct the PCRF to cancel the redirection policy after receiving the packet, no delay problem of a billing system exists, thereby avoiding that a user is repeatedly redirected to a recharging page of the server during a delay time and enhancing user experience.

An embodiment of the present invention further provides a system for canceling redirection. The system includes the GW provided in the sixth embodiment of the present invention and the server provided in the seventh embodiment of the present invention.

A person skilled in the art should be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solution. A person skilled in the art may use different apparatuses to implement the described functions for each particular application, but it should not be considered that the implementation goes beyond the scope of the present invention.

The apparatuses or algorithm steps described in combination with the embodiments disclosed in this specification may be implemented by hardware, a software module executed by a processor, or a combination thereof. The software module may be placed in a random access memory (RAM), a memory, a read-only memory (ROM), an electrically programmable ROM, an electrically erasable programmable ROM, a register, a hard disk, a removable magnetic disk, a CD-ROM, or a storage medium of any other form well-known in the technical field.

In the foregoing specific embodiments, the objectives, technical solutions, and beneficial effects of the present invention are further described in detail. It should be understood that the foregoing descriptions are merely specific embodiments of the present invention, but are not intended to limit the protection scope of the present invention. All modifications, equivalent replacements, improvements or the like made within the spirit and principle of the present invention shall fall within the protection scope of the present invention.

What is claimed is:

1. A method for canceling redirection, the method comprising:
   redirecting, by a gateway (GW), a user equipment (UE) to a recharging page of a server according to a redirection policy;
   receiving a recharging success packet sent by the server; and
   instructing, according to the recharging success packet, a policy and charging rules function (PCRF) to cancel the redirection policy.

2. The method for canceling redirection according to claim 1, wherein receiving the recharging success packet sent by the server comprises:
   obtaining, by the GW, the recharging success packet by monitoring a packet that is sent from the server to the UE.

3. The method for canceling redirection according to claim 1, wherein receiving the recharging success packet sent by the server comprises:
   receiving the recharging success packet from the UE, wherein the recharging success packet is sent by the server to the UE.

4. The method for canceling redirection according to claim 1, wherein the GW receives the redirection policy from the PCRF.

5. A method for canceling redirection, the method comprising:
   receiving, by a server, a recharging request of a user equipment (UE); and
   when recharging for the UE succeeds, sending a recharging success packet to a gateway (GW) for the GW to instruct a policy and charging rules function (PCRF) to cancel a redirection policy.

6. The method for canceling redirection according to claim 5, wherein sending the recharging success packet to the GW comprises:
   sending the recharging success packet to the UE, and the recharging success packet is acquired by the GW at the same time.

7. The method for canceling redirection according to claim 5, wherein sending the recharging success packet to the GW comprises:
   sending the recharging success packet to the UE, and the recharging success packet is sent by the UE to the GW.

8. A gateway, comprising:
   a redirecting unit, configured to redirect a user equipment (UE) to a recharging page of a server according to a redirection policy;
   a receiving unit, configured to receive a recharging success packet sent by the server; and
   a canceling unit, configured to instruct, according to the recharging success packet, a policy and charging rules function (PCRF) to cancel the redirection policy.

9. The gateway according to claim 8, wherein the receiving unit is further configured to:
   obtain the recharging success packet by monitoring a packet that is sent from the server to the UE.

10. The gateway according to claim 8, wherein the receiving unit is further configured to:
    receive the recharging success packet from the UE, wherein the recharging success packet is sent by the server to the UE.

11. The gateway according to claim 8, wherein the redirecting unit is further configured to:
    receive the redirection policy from the PCRF.

12. A server, comprising:
    a receiving unit, configured to receive a recharging request of a user equipment (UE) sent by a gateway (GW); and
    a canceling unit, configured to, when recharging for the UE succeeds, send a recharging success packet to the GW for the GW to instruct a policy and charging rules function (PCRF) to cancel a redirection policy.

13. The server according to claim 12, wherein the canceling unit is further configured to:
    send the recharging success packet to the UE, and the recharging success packet is acquired by the GW at the same time.

14. The server according to claim 12, wherein the canceling unit is further configured to:
    send the recharging success packet to the UE, and the recharging success packet is sent by the UE to the GW.

15. A gateway, comprising:
    a network interface;
    a processor;
    a memory; and
    an application program physically stored in the memory, wherein the application program comprises instructions configured to cause the processor to:
      redirect a user equipment (UE) to a recharging page of a server according to a redirection policy,
      receive a recharging success packet sent by the server, and
      instruct, according to the recharging success packet, a policy and charging rules function (PCRF) to cancel the redirection policy.

16. The gateway according to claim 15, wherein the application program comprises instructions configured to cause the processor to:

obtain, by the GW, the recharging success packet by monitoring a packet that is sent from the server to the UE.

17. The gateway according to claim 15, wherein the application program comprises instructions configured to cause the processor to:
receive the recharging success packet from the UE, wherein the recharging success packet is sent by the server to the UE.

18. The gateway according to claim 15, wherein the application program further comprises instructions configured to cause the processor to:
receive the redirection policy from the PCRF.

19. A server, comprising:
a network interface;
a processor;
a memory; and
an application program physically stored in the memory, wherein the application program comprises instructions configured to cause the processor to:
receive a recharging request of a user equipment (UE), and
when recharging for the UE succeeds, send a recharging success packet to a gateway (GW) for the GW to instruct a policy and charging rules function (PCRF) to cancel a redirection policy.

20. A system for canceling redirection, the system comprising:
a gateway; and
a server;
wherein the gateway is configured to redirect a user equipment (UE) to a recharging page of a server according to a redirection policy, receive a recharging success packet sent by the server, and instruct, according to the recharging success packet, a policy and charging rules function (PCRF) to cancel the redirection policy; and
wherein the server is configured to receive the recharging request of the UE sent by the GW, and when recharging for the UE succeeds, send a recharging success packet to the GW.

* * * * *